United States Patent [19]
Barton et al.

[11] Patent Number: 5,162,478
[45] Date of Patent: Nov. 10, 1992

[54] POLY(SILYLENE)VINYLENES FROM ETHYNYLHYDRIDOSILANES

[75] Inventors: Thomas J. Barton; Sina Ijadi-Maghsoodi, both of Ames, Iowa

[73] Assignee: Iowa State University Research Foundation, Inc., Ames, Iowa

[21] Appl. No.: 583,163

[22] Filed: Sep. 17, 1990

[51] Int. Cl.$^5$ .............................................. C08G 77/06
[52] U.S. Cl. ............................:...................... 528/15; 528/31; 556/479
[58] Field of Search ...................... 528/15, 31; 556/479

[56] References Cited

U.S. PATENT DOCUMENTS

| | | | |
|---|---|---|---|
| 4,667,006 | 5/1987 | Ai et al. | 526/285 |
| 4,940,767 | 7/1990 | Barton et al. | 528/35 |

FOREIGN PATENT DOCUMENTS

| | | |
|---|---|---|
| 58-206611 | 12/1983 | Japan . |
| 59-155409 | 9/1984 | Japan . |
| 60-208308 | 11/1984 | Japan . |
| 59-210915 | 11/1984 | Japan . |
| 61-113605 | 5/1986 | Japan . |
| 61-118411 | 6/1986 | Japan . |
| 61-247714 | 11/1986 | Japan . |
| 480731 | 6/1976 | U.S.S.R. . |
| 2135319 | 8/1984 | United Kingdom . |

OTHER PUBLICATIONS

Korshak et al., Izv Akad. Nauk SSSR, 12, 2251 (1962) and English translation.
Luneva et al., Vysokomol. Soyed. 7, 3, 427 (1965) and English translation.
Andrianov et al., Vysokomol. Soyed., 8, 9, 1623 (1966) and English translation.

*Primary Examiner*—Melvyn I. Marquis
*Attorney, Agent, or Firm*—Zarley, McKee, Thomte, Voorhees & Sease

[57] ABSTRACT

Catalytic polymerization of dialkyl-, alkylaryl- or diaryldiethynylhydridosilanes cleanly affords soluble poly(silylene)vinylenes which can be shaped as fibers, films and bulk objects and thermally converted to silicon carbide.

9 Claims, No Drawings

POLY(SILYLENE)VINYLENES FROM ETHYNYLHYDRIDOSILANES

GRANT REFERENCE

This invention was made with Government support under Contract No. W-7405-ENG-82 awarded by the Department of Energy. The Government has certain rights in the invention.

FIELD OF THE INVENTION

This invention relates generally to a route to organosilicon polymeric materials which can be converted to silicon carbide upon heating above 700° C.

BACKGROUND OF THE INVENTION

Silicon carbide is a compound shown by a chemical formula of SiC and is usually produced in block form by reactions of $SiO_2$ with C at high temperature of about 1,900° C.-2,200° C. Its chemical inertness, extreme hardness and high temperature oxidative stability finds many uses such as in high temperature electrical heating units, furnace walls, mufflers, abrasives, rocket nozzles, automotive engine parts and turbine parts.

In order to produce a silicon carbide molding having a particularly defined shape, the above described block is pulverized, and the resulting mixture is molded and then sintered. Of course, it has been impossible to produce SiC fiber from the above process. Organosilicon polymeric materials have been used as ceramic precursors to SiC fibers. Polysilanes, R. West, L. D. David, P. I. Djurovich and H. Yu, *Am. Ceram. Soc. Bull.*. 62 899 (1983) and polycarbosilanes, S. Yajima in *Handbook of Composites:* Eds, W. Watt and B. V. Perov; Elsevier, New York; Vol. 1, Ch. VI, pp. 201-37, 1985, are used for this purpose, but multistep preparation processes as well as removal of salts have made these routes lengthy and unattractive.

It is a principal object of this invention, therefore, to provide a polymer that can be used directly to form fibers.

Another object of the invention is to provide a silylene vinylene polymer which undergoes thermolysis to SiC. This polymer could be used for densification of silicon carbide bodies.

A further object of the invention is to provide an easy, efficient, clean and fast process for preparing the silylene vinylene polymers in high yield.

SUMMARY OF THE INVENTION

This invention relates to a method of preparing polymeric ethynylhydridosilanes in a single step, one pot synthesis. The compounds are prepared in high yield, yielding organosilicon polymeric materials which are white, soluble in organic solvents, and having a general average molecular weight of around 20,000. They can be melted reversibly and used to make silicon carbide fibers.

DETAILED DESCRIPTION OF THE INVENTION

This invention relates to a process for preparing poly(silylene)vinylene (1) by catalytic self-hydrosilylation of hydridoethylsilane.

V. V. Korshak, A. M. Sladkov and L. K. Luneva, *Izv. Akad. Nauk SSSR.* 12 2251 (1962) first reported preparing poly(silylene)vinylene in 1962.

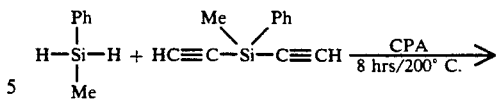

However, their polymer 1 was only slightly soluble in benzene. However, in 1965 L. K. Luneva, A. M. Sladkov and V. V. Korshak, *Vysokomol. soyed.*, 7, 3, 427 (1965) reported different physical properties for this polymer (brown, soluble in benzene, heptane, toluene) and the related copolymer, 2.

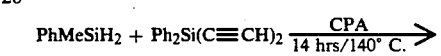

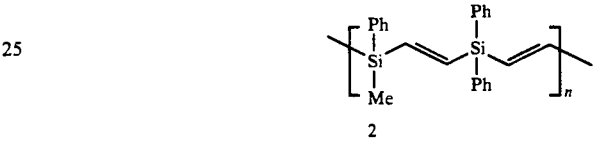

$M_w = 6,000$
Brown, soluble in benzene

In 1966 K. A. Andrianov, V. I. Pakhomov, V. M. Gel'perina and G. A. Semenova, *Vysokomol. soyed.*, 8, 9, 1623 (1966) reported making poly(silylene)vinylenes (psv) from a different route, namely a redistribution reaction.

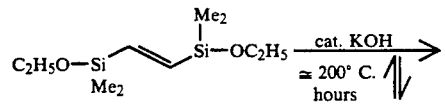

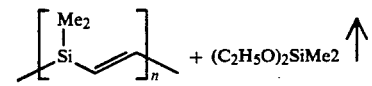

These polymers were not characterized. Thus, in both reported routes to psv's, high temperatures and long reaction times are required. The present invention provides a fast, high-yielding, catalytic route to psv's which requires no added heat, can be conducted with or without solvent, uses only a single bifunctional reagent and requires no product separation step as no by-products are produced.

In the present invention the poly(silylene)vinylene polymers are prepared in an efficient route, using monomers with stoichiometrically fixed functionally, to give high molecular weight clean products in high yield, often as much as 90% or greater.

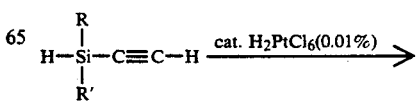

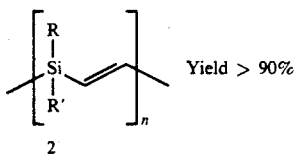

Poly(silylene)vinylenes 2 are white and are fully characterized and can be pulled into fibers, cast into films and thermally converted into silicon carbide as revealed by X-ray analysis.

Both the process and the polymer of the present invention are illustrated by the above identified reaction equation. In the formula for the ethynylhydridosilane R and R' may be the same or different. Generally speaking, they are organic moieties selected from the group consisting of $C_1$ to $C_{20}$ alkyl, $C_6$ to $C_{20}$ aryl, and $C_7$ to $C_{20}$ alkylaryl. Preferably R and R' are selected from the group consisting of $C_1$ to $C_5$.

The polymers of the present invention generally have a molecular weight within the range of about 2,000 to about 120,000. The average molecular weight on a weight average basis is generally around 20,000. The number of recurring units in the polymer will vary, that is "n" may be from as little as 20 up to 500, but preferably will have an average chain length within the range of from about 200 to about 300 recurring units. Further details of the polymer, the polymer characterization and structure will be given in the examples.

As illustrated in the above equation, it is preferred that the reaction be conducted in the presence of a catalyst, particularly a noble metal catalyst.

Although any of the established hydrosilylation catalysts [e.g., $(Ph_3P)_3RhCl$, $(PhCO)_2O$, $Ph_3P+Pd$, $Pd(PPh_3)_4$, $Ru_3(CO)_{12}$] can be employed, most preferably the catalyst is a platinum catalyst and as illustrated in the equation, the most preferred catalyst is chloroplatinic acid. The amount of catalyst will vary within the range of catalytic amounts needed to successfully produce the polymer, but generally low amounts can be used, as low as 0.01% by weight of the monomer. Generally, the amount of catalyst should be within the range of from 0.005% by weight of the monomer up to as much as 0.1% by weight of the monomer. 0.01% has been found quite satisfactory to achieve up to as high as 90% or greater yields.

The reaction may be run in the presence of a solvent or without a solvent. When solvents are employed the solvent may be any suitable inert organic solvent. Preferably the solvent is selected from the group of tetrahydrofuran, diethyl ether, benzene and hexane.

The reaction is exothermic and it does not appear to be either time or temperature dependent. It can be run at room temperature, for as little as 30 minutes. The polymerization produces a precipitated white polymer, which can be easily separated and dried by conventional techniques. The polymers are converted to the ceramic, silicon carbide, upon heating up to as much as 700° C. and the ceramic yields are uniformly high. Many of these polymers can be pulled into fibers. All can be cast into films.

The following examples are offered to further illustrate but not limit the product and process of the present invention.

EXAMPLE 1

Polymerization of dimethylethynylsilane

To a dry, argon flushed, 50 mL, two-necked, round-bottomed flask (equipped with a magnetic stirrer and dry ice condenser) was added 0.001 gram of chloroplatinic acid $H_2PtCl_6$ (known as CPA), then capped with a rubber septum, 10 mL THF added, followed by covering with an argon atmosphere. To this solution was added 5 grams (0.06 mol) of dimethylethynylsilane in a dropwise fashion while stirring the mixture. Exothermic reaction was started after the initial induction period with some reflux. After magnetically stirring the solution at room temperature for 30 minutes, the polymerization was terminated by adding the reaction mixture to 150 mL of methanol. The white polymer which precipitated was separated by centrifugation and dried to a constant weight under vacuum over 24 hours. The polymer yield was about 90%. The above polymer was formed in 5 minutes without solvent. The resulting polymer had the following characterization:

Weight average molecular weight, $M_w = 30,400$

Polydispersity $\frac{M_w}{M_n} = 4.8$

| FTIR: | 2937, 2955 cm$^{-1}$/S C—H |
| --- | --- |
| | 1252 cm$^{-1}$/S Si—Me |
| | 1173, 1011 cm$^{-1}$ Si—\\ |
| $^1$H NMR: | δ0.1, 6.6 ppm broad |
| $^{13}$C NMR: | δ-3.4, 150 ppm |
| $^{29}$Si NMR: | δ-15.37 ppm |
| (All NMR spectra obtained in the liquid solution) | |

| Elemental analysis: | % C | % H |
| --- | --- | --- |
| Calc. | 57.06 | 9.58 |
| Exp. | 56.95 | 9.32 |

Furthermore, this white polymer was found to be soluble in a variety of organic solvents and melts reversibly at ca. 105° C.

As can be seen from the example illustrated, a simple one-step catalytic polymerization afforded the poly(silylene)vinylene in about 90% yield was formed in about five minutes without solvent being present. It can therefore be seen that the invention clearly accomplishes the objectives earlier enumerated.

What is claimed is:

1. A method of preparing polymeric ethynylhydrisilanes, comprising:
Polymerizing an ethynylhydridosilane of the formula:

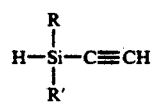

in the presence of an effective amount of hydrosilation catalyst, wherein R and R' are organic moieties selected from the group consisting of $C_1$ to $C_{20}$ alkyl, $C_6$ to $C_{20}$ aryl, and $C_7$ and $C_{20}$ alkylaryl to yield a poly(silylene)vinylene of the formula

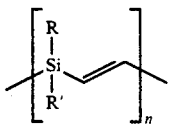

wherein "n" is an integer of from 20 to 500.

2. The method of claim 1 wherein R and R' are the same.

3. The method of claim 1 wherein R and R' are different.

4. The method of claim 1 wherein the reaction is run in the presence of a reaction promoting organic solvent.

5. The method of claim 4 wherein the reaction solvent is selected from the group consisting of aliphatic and aromatic hydrocarbons.

6. The method of claim 5 wherein the reaction solvent is selected from the group consisting of tetrahydrofuran, diethylether, benzene and hexane.

7. The process of claim 1 wherein the catalyst is a noble metal catalyst.

8. The process of claim 7 wherein the catalyst is a platinum catalyst.

9. The process of claim 8 wherein the catalyst is chloroplatinic acid.

* * * * *